United States Patent [19]
Ohuchi et al.

[11] Patent Number: 5,400,498
[45] Date of Patent: Mar. 28, 1995

[54] APPARATUS FOR REMOVING KEYS FROM SUPPORT GRID

[75] Inventors: Katsunori Ohuchi; Nobuo Miwa; Hitoshi Inada, all of Ibaraki, Japan

[73] Assignee: Mitsubishi Nuclear Fuel Co., Tokyo, Japan

[21] Appl. No.: 138,965

[22] Filed: Oct. 21, 1993

[30] Foreign Application Priority Data

Oct. 22, 1992 [JP] Japan .................................. 4-284746

[51] Int. Cl.6 ............................................. B23P 19/04
[52] U.S. Cl. ..................................... 29/723; 29/906; 376/261; 901/39
[58] Field of Search ................. 29/723, 906; 376/261, 376/446, 463; 414/736, 741; 294/86.4; 165/11.2; 901/29, 36, 38, 39

[56] References Cited

U.S. PATENT DOCUMENTS

| | | | |
|---|---|---|---|
| 3,077,361 | 2/1963 | Tait et al. | 29/723 X |
| 3,887,980 | 6/1975 | Yates et al. | 29/723 |
| 3,894,327 | 7/1975 | Jabsen | 29/723 |
| 4,913,617 | 4/1990 | Nicholson | 414/736 X |
| 5,068,081 | 11/1991 | Oyama et al. | 376/261 |
| 5,272,743 | 12/1993 | Yamazaki et al. | 376/261 X |

FOREIGN PATENT DOCUMENTS

| | | | |
|---|---|---|---|
| 0105779 | 4/1984 | European Pat. Off. | |
| 181768 | 5/1986 | European Pat. Off. | 29/723 |
| 0196609 | 10/1986 | European Pat. Off. | |
| 3611312 | 10/1987 | Germany | 901/39 |
| 15052 | 1/1987 | Japan | 901/39 |
| 738867 | 6/1980 | U.S.S.R. | 901/36 |
| 1256956 | 9/1986 | U.S.S.R. | 901/39 |
| 1458221 | 10/1989 | U.S.S.R. | 901/36 |

OTHER PUBLICATIONS

Mark Rosheim "The 2-Roll Gripper" Robotics Age, Jan./Feb. 1983, pp. 32-38.
Patent Abstracts of Japan, vol. 14, No. 525 (P-1132), Nov.19, 1990, JP-A-02 221 890, Sep. 4, 1990.

Primary Examiner—Peter Dungba Vo
Attorney, Agent, or Firm—Oblon, Spivak, McClelland, Maier & Neustadt

[57] ABSTRACT

An apparatus is presented for removing the keys smoothly and reliably from support grids of a fuel assembly. The apparatus performs the task of removing the keys, which had been inserted into the grid through the opening sections of the grid, and enables mechanization and automation of the key removal operation. The apparatus has a robotic arm including a pair of parallel grid support members freely movably disposed at the end of the robotic arm for clamping onto the side edges of the grid. The apparatus further includes a key rotation device disposed on the support arm for engaging with and rotating the keys; a key moving device disposed on the grid support members so as to hold the keys and move the keys in the direction of the key axis.

6 Claims, 5 Drawing Sheets

APPARATUS FOR REMOVING KEYS FROM SUPPORT GRID

BACKGROUND OF THE INVENTION

1. Field of the Invention

The present invention relates to an apparatus for assembling a fuel assembly and more specifically relates to an apparatus for mechanically or automatically removing the keys which had been inserted into the supporting grids of a fuel assembly for deflecting the springs away from the dimples to enable smooth loading of the fuel rods into the supporting grids.

2. Background Technology

In general, pressurized light water nuclear reactors utilize a type of fuel assembly comprising: an upper nozzle and a lower nozzle; a plurality of supporting grids for supporting the fuel rods (shortened to grids henceforth) disposed between the nozzles with a certain spacing; instrumentation pipes and fuel rod guide pipes inserted into and attached to the grid cells of the grids; and a plurality of fuel rods inserted into and held elastically in the grid cells between the springs and the dimples formed inside the grid cells.

As shown in FIGS. 3 and 4, the grid 1 is made by intersecting a plurality of straps 1a which cross each other at right angles. As shown in FIG. 3, the arrangement of the dimples 2 and springs 3 is symmetrical with respect to an axis at right angles to the paper passing through the center O formed by the intersection of a line X—X and a line Y—Y. The dimples 2 and the springs 3 are disposed so that they are symmetrical in each of the four quadrants. In FIG. 3, the reference numeral 4 and 5 designate, respectively, grid cells 7 for housing a control rod guide pipe and housing instrumentation pipes. In FIG. 4, the reference numeral 6 refers to an inner key.

When assembling such a fuel assembly, there is a danger of introducing scratches on the surface of the fuel rods if the rods are inserted into the grid cells with the springs and ,dimples protruding out into the grid cells, because the springs and dimples are formed on the inside walls of the grid cells. To prevent damaging the surface of the fuel rods, there have been various methods suggested to deal with the prevention of surface damage problem.

For example, a method proposed in a U.S. Pat. No. 5,068,081 (Japanese Patent Application No. S64-957) proposed the following fuel assembly. In this fuel assembly, insertion openings 8 are formed in the grids 1, and the spring deflection jigs (not shown) are inserted into the grid cells 7 through the insertion openings 8 to deflect the springs 3 away from the dimples 2 formed in each wall of the grid cell 7 for elastically holding the fuel rod. The keys 6 are inserted through the key insertion openings 8 to keep the springs 3 in the deflected position, so as to allow the fuel rods to be inserted into the grid cells 7 smoothly without the danger of causing surface damage. To remove the keys 6 from the fuel assembly, the keys are first moved along the direction of the key axis, and the hook 6a is disengaged from the rib 1b of the strap 1a. Next, the keys 6 are rotated about the key axis through 90 degrees thereby orienting the keys 6 so that the hook 6a would not interfere with the rim section 8a of the insertion openings 8, and the keys 6 are removed from the grid 1 by withdrawing the keys 6 along the direction of the key axis 6.

Further, an improvement in the key design such as the one shown in FIG. 6 has also been made. The key 9 shown in FIG. 6 has a protrusion sections 9a disposed at regular intervals so as to contact the rim section 8a of the insertion openings 8 to enable to deactivate the spring 3. The protrusion section 9′a has a tapered section 9′b so that it can be moved in the key axis direction via the tapered section 9′b to disengage the protrusion section 9′a from the rim section 8a of the insertion openings 8. Next, the key 9 is rotated 90 degrees about the key axis so that the protrusion section 9′a will not interfere with the rim section 8a of the insertion openings 8, and the key 9 is removed from the grid 1.

However, such insertion and removal operations for the keys 6, 9 are based on manual approach, causing operational problems because the tasks are cumbersome, the operations 143 lengthy and the efficiency is low. Furthermore, the workers involved in the key removal operation are required to work in the proximity of the fuel rods, and are particularly vulnerable to radiation exposure. From these viewpoints, there has been a need to automate the key removal operation.

SUMMARY OF THE INVENTION

The present invention was made in view of the background technology described above, and an objective is to present a key removal apparatus which performs the task of key removal smoothly and reliably, and would enable mechanization and automation of the key removal operation.

The above objective is achieved in an apparatus for removing keys from a grid of a fuel assembly having fuel rods inserted in a plurality of grid cells, formed by a plurality of straps of a thin longitudinal strip form intersecting at right angles to each other, having dimples formed on one adjacent pair of wall of the grid cells and springs formed on opposing pair of walls of the grid cells, wherein a plurality of keys which had been inserted in the grid in the longitudinal direction of the strap through opening sections formed near the intersections of the plurality of straps are removed by the apparatus comprising; a robotic arm means disposed so that the end section of the robotic arm is freely movable and the orientation of the robotic arm is changeable within a specific space; a pair of support members disposed at an end of the robotic arm means so as to enable each support member to approach or move away from each member; a key rotation device positioned so as to correspond with the keys inserted into the opening sections of the grid for rotating the keys about the key axis; a key moving device disposed on the support members for holding the ends of the keys inserted in the opening sections of the grid and move the keys in the direction of the key axis.

The apparatus of the above construction operates by closing the pair of support members onto the side edges of the grid so as to engage the engaging members with the ends of the keys, and the key rotation device is then rotated through a specific angle, thereby disengaging the keys from the grid. The key moving device is operated next to move the keys along the direction of the key axis, thereby to remove the keys completely from the grid.

PREFERRED EMBODIMENT OF THE INVENTION

An embodiment of the key removal apparatus will be explained with reference to FIGS. 1 to 4.

Figure 1:
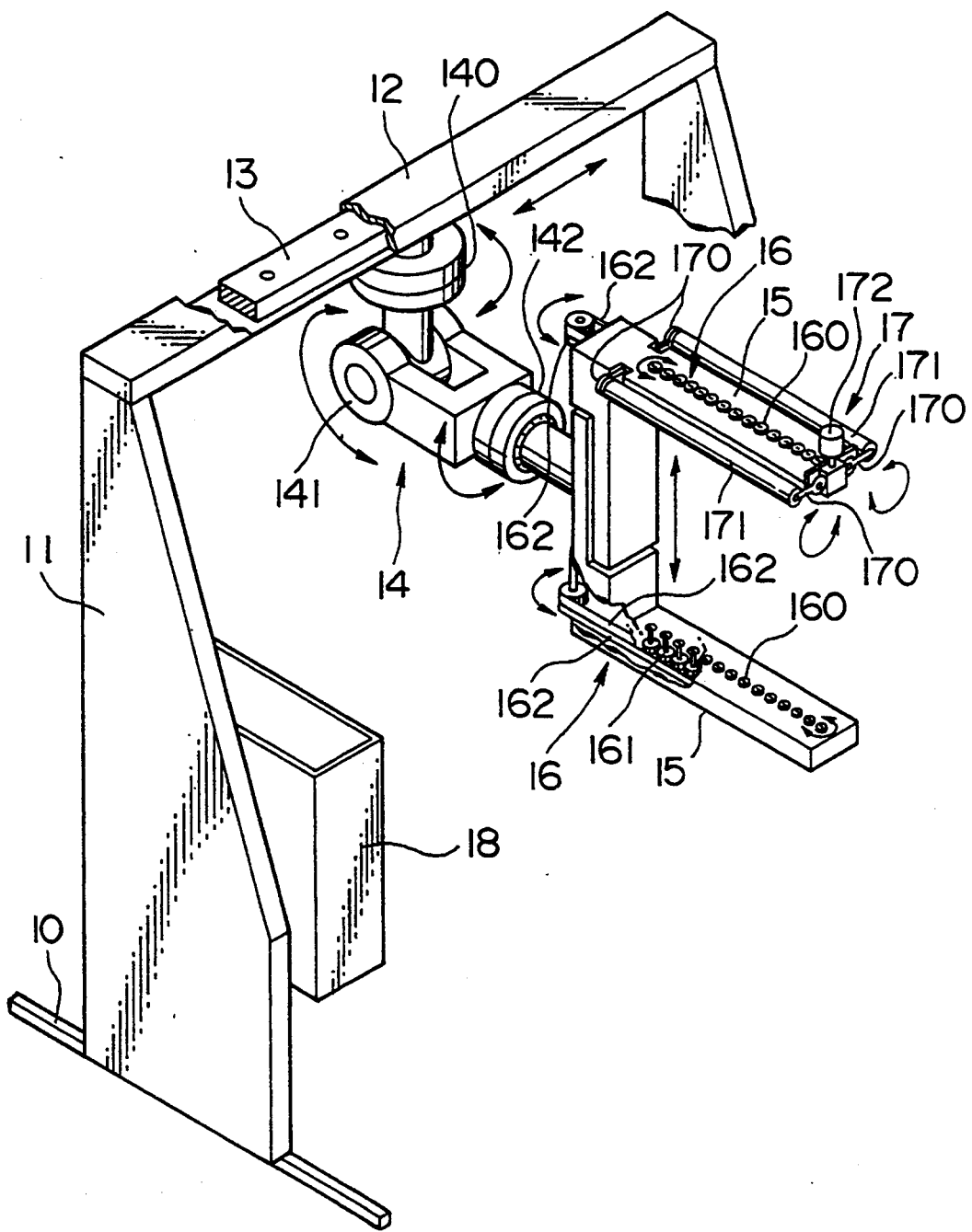
FIG. 1 is a perspective view of a first embodiment of the key removal apparatus of the present invention.
Figure 2:
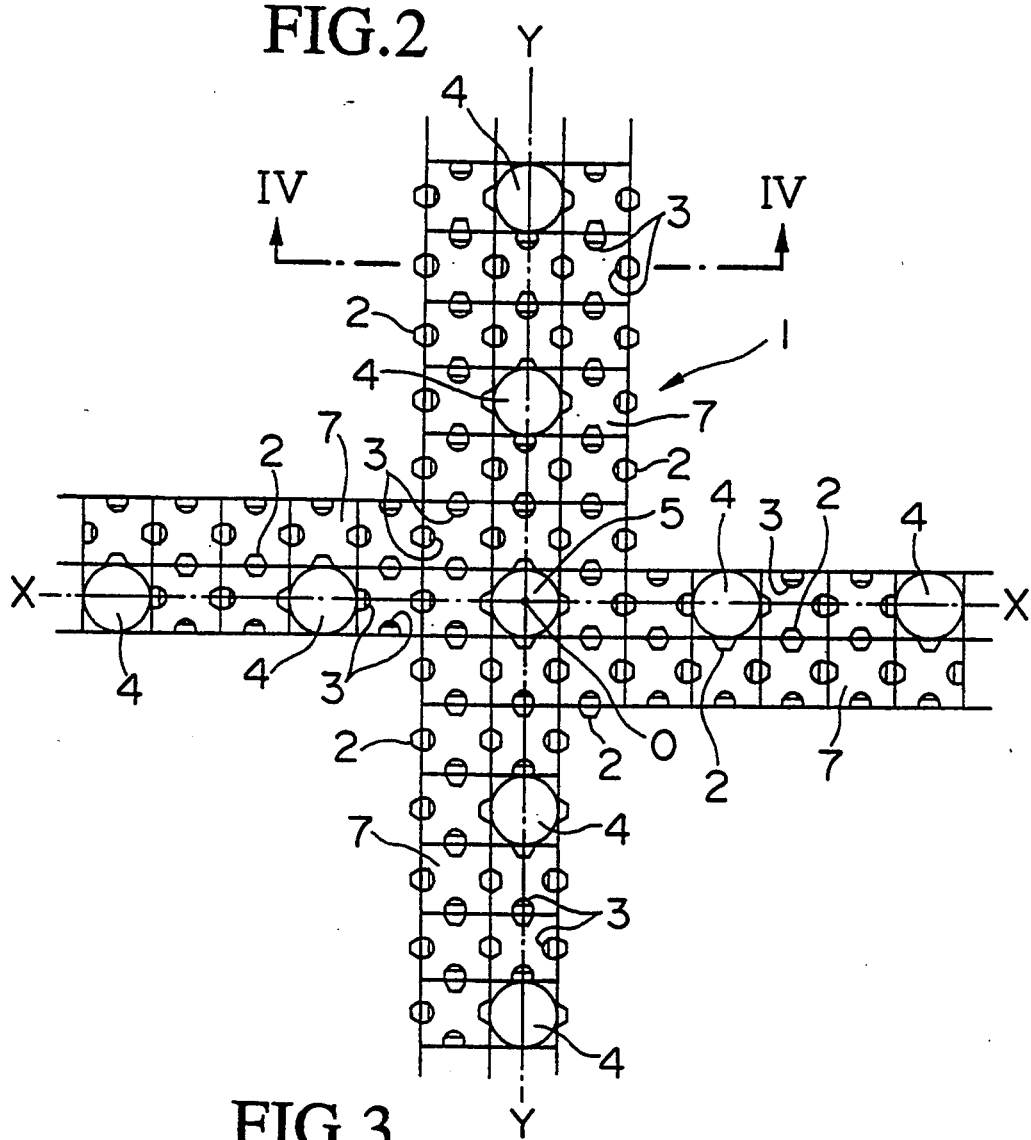
FIG. 2 is a view showing the key rotation device attached to the side edge of the grid seen along the direction of the fuel rods.
Figure 3:
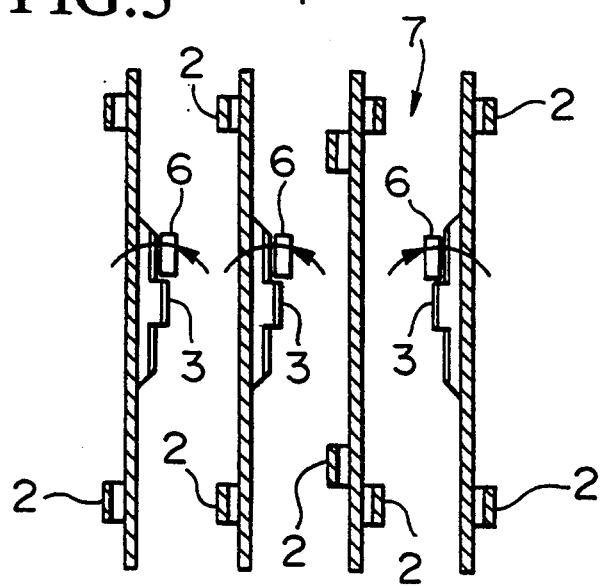
FIG. 3 is an illustration to explain the arrangement of the dimples and springs formed in the grid cells in the central region of the grid.
Figure 4:
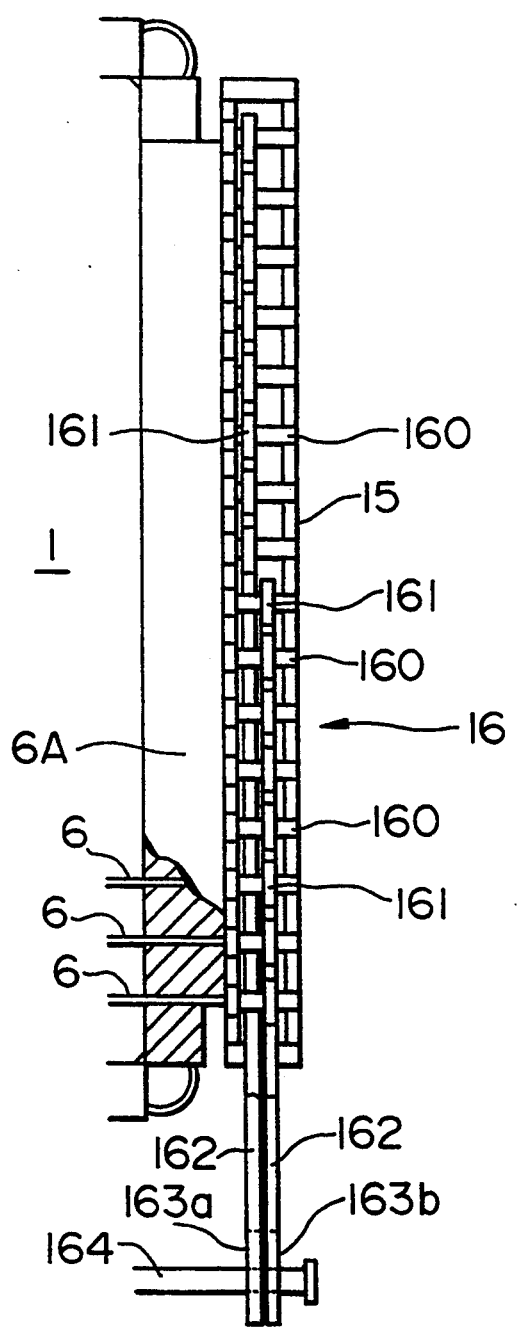
FIG. 4 is a cross sectional view of a section through the line IV—IV in FIG. 3 showing how the keys are operated.

FIGS. 1 and 2 show a key removal apparatus for removing the inner keys which are disposed in the inner grid cells, and outer keys 6A which are disposed in the outer grid cells of the grid. Both types of keys are used to retract the springs away from the dimples in the grid, before the fuel rods are inserted into the grids. The key removal apparatus is used to remove the inner keys 6 from the grid. In the following descriptions, they are simply referred to as keys.

The key removal apparatus includes a gate-shaped running bridge (transporting means) 11 movably disposed on a pair of guide rails 10. A robotic arm 14 is movably disposed on a traversing rail 13 attached to the bottom surface of the horizontal section 12 of the running bridge 11. The robotic arm 14 is provided with a pair of grid support members 15, disposed at the tip end of the robotic arm 14, which can move towards or away from each member. A key rotation device 16 rotates the keys 6 inserted into the grid 1 about the key axis. Further, the grid support member 15 is provided with a key moving device 17 for moving the keys 6 inserted into the grid 1 along the key axis.

The robotic arm 14 is provided with an elbow section 140 which rotates in a horizontal plane, and a pair of elbow sections 141, 142 which rotate in mutually orthogonal planes. The key rotation device 16 includes a plurality of engaging members 160 freely rotatably disposed on the pair of grid support members 15. Each engaging member 160 has a rectangular-shaped through holes. A timing pulley 161 is disposed on the outer peripheral of each engaging member 160. A pair of endless belts 162 are applied on each of a set of eight timing pulleys 161. A pair of one-way clutches 163a, 163b are engaged with each pair of endless belt 162. A drive shaft 164 is attached to each of the one-way clutches 163a, 163 and a drive motor (not shown) is connected to the drive shaft 164. The key moving device 17 includes a pair of support arms 170 freely rotatably disposed on each of the grid support member 15. A roller member 171 rotatably is disposed on the edge of each support arm 170. An arm driving motor 172 is attached via a transmission device to each support arm 170 and a drive motor (not shown) is engaged with each roller member 171. In FIG. 1, the reference numeral refers to a storage box 18 for storing the keys 6.

The operation of the key removing apparatus of the construction mentioned above will be explained with reference to FIG. 5.

First, the grid support members 15 are opened, and the running bridge 11 is moved along the guide rails 10, the robotic arm 14 is moved along the traversing rail 13, the elbow sections 140, 141 and 142 are rotated so as to dispose the grid support members 15 on both side surfaces of the grid 1 which has been disposed with the keys 6 and the outer keys 6a which are disposed on the outer peripheral grid cells 7. Next, the support arms 15 are moved toward the side surfaces to close the support arms 15 so that the ends of the keys 6 are inserted into the through holes of the engaging members 160 freely rotatably disposed on the support arms 15. Next, by using the arm rotation motor 172 of the key moving device 17, each pair of support arms 170 are rotated down towards each other to hold the keys 6 between the roller members 171. By operating the roller driving motors to rotate the roller members 171, the keys 6 are moved in the direction of the key axis, thereby disengaging the hooks 6a from the ribs 1b. Accordingly, the springs 3 are allowed to extend towards the dimples 2, thus firmly holding the fuel rods therebetween. At this time, the arm driving motor 172 is reversed to separate the pair of roller members 171, thus releasing the clamping of the keys 6 by the roller members 171. Next, the driving shaft 164 is rotated 90 degrees in one direction by the driving motor, then one of the one-way clutches 163a, 163b, for example 163a, transmits the rotational force of the driving shaft 164 to the belt 162 via the timing pulleys 161. The set of eight engaging members 160 are then rotated via the belt 162 and the timing pulleys 161 in .one direction. The result is that the keys 6 engaged with the rectangular through holes of the engaging members 160 are likewise rotated 90 degrees. The pair of support arms 170 are again operated to rotate the roller members 171 in place by operating the arm driving motor 172 to move the roller members 171 towards each other to again clamp the keys 6 therebetween. By operating the roller driving motor to rotate the roller members 171, the keys 6 are completely removed from the grid 1.

The keys 6 thus removed from the grid 1 are stored in the key Storage box 18 by separating the grid support member 15 from the grid 1 and operating the running bridge 11 and robotic arm 14 suitably. It has been demonstrated that the key removal apparatus of the present invention removes the keys smoothly and reliably from the grid and allows mechanization and automation of the removal operation.

Figure 5:
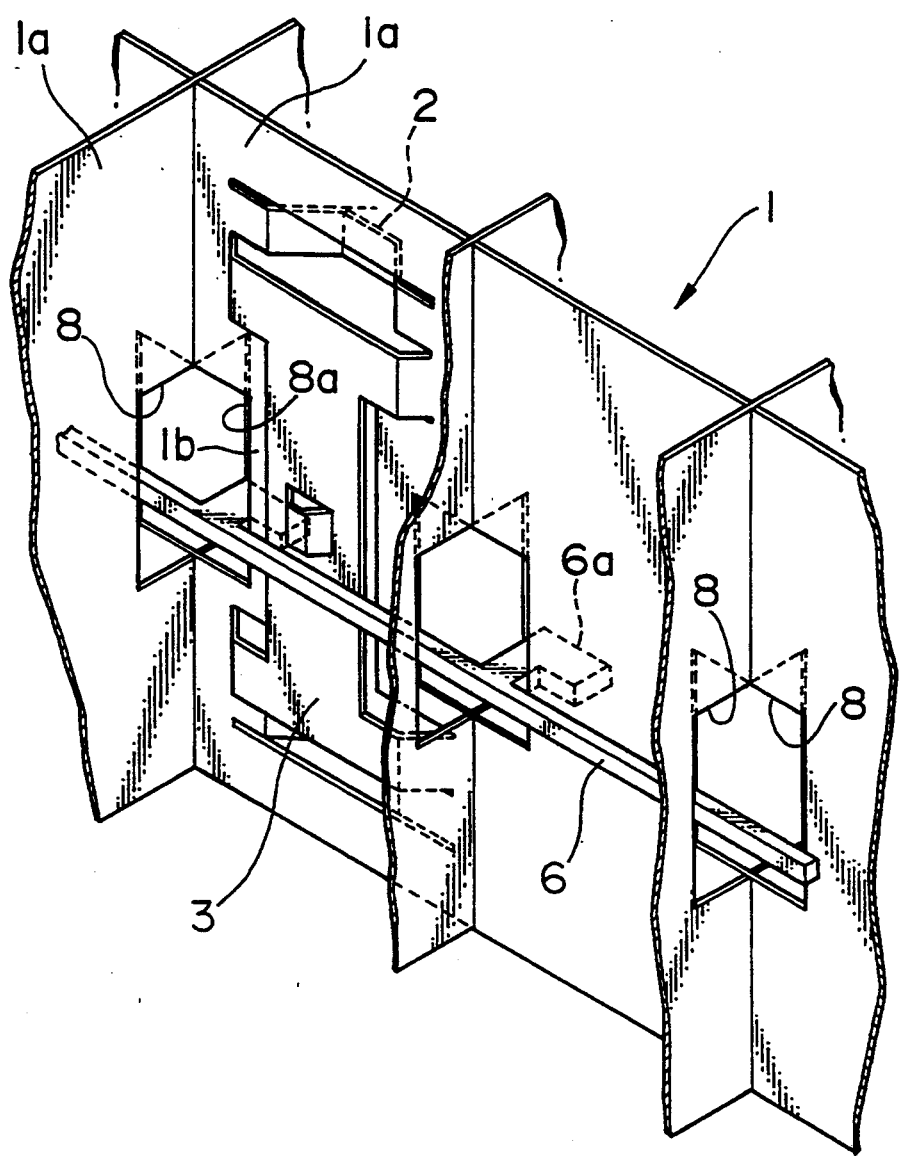
FIG. 5 is a partial enlarged view of a cut away section of one type of key design applicable to the key removal apparatus of the embodiment.
Figure 6:
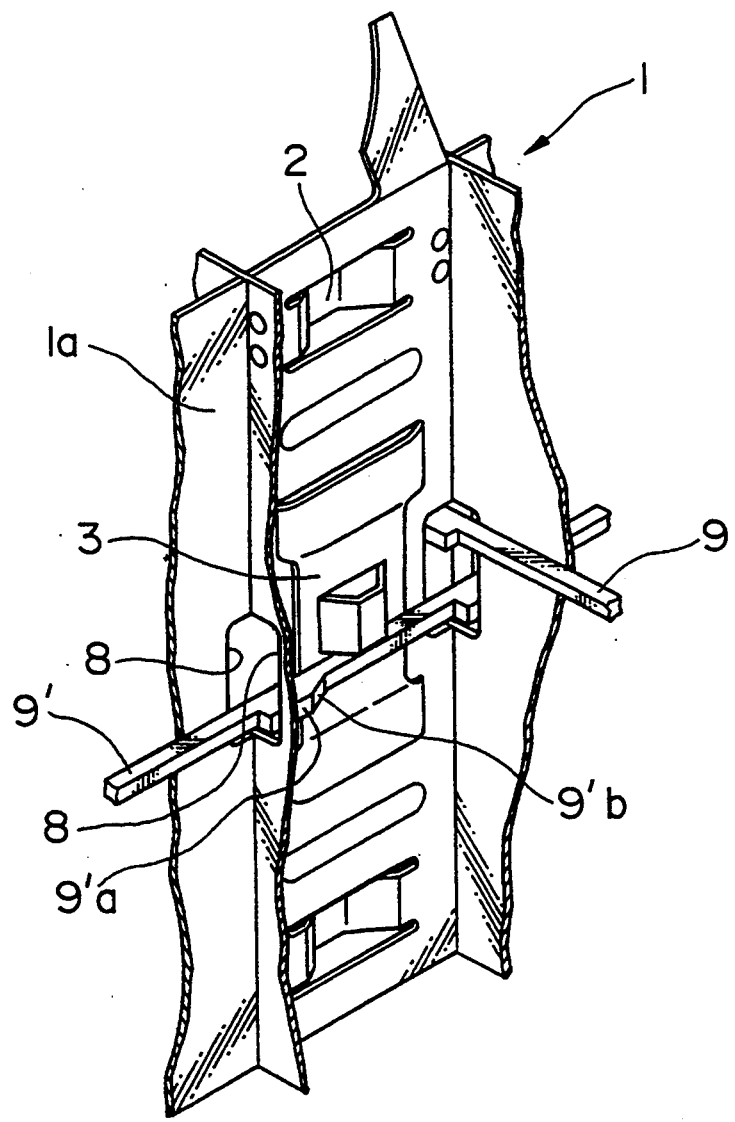
FIG. 6 is a partially enlarged view of a cut away section of another type of key design applicable to the key removal apparatus of the embodiment.

As mentioned earlier, the key removal apparatus is able to handle two types of keys (6, 9) shown in FIGS. 5 and 6. However, the operation to remove the keys 9 shown in FIG. 6 is basically the same as that described for the keys 6 shown in FIG. 5. The keys 9 are first moved in the key axis direction via the tapered section 9b to disengage the protrusion 9a from the rim section 8a, and the keys 9 are rotated 90 degrees and moved along the key axis to remove the keys 9 completely from the grind 1.

What is claimed is:

1. An apparatus for removing a plurality of keys (6, 9) from a grid of a fuel assembly after inserting fuel rods in said grid which is formed by a plurality of straps of a thin longitudinal strip form intersecting at right angles to each other to form a plurality of grid cells and having dimples formed on one adjacent pair of walls of said grid cells and springs formed on opposing pair of walls of said grid cells, said plurality of keys are inserted in said grid in a longitudinal direction of said straps through insertion openings formed near the intersections of said plurality of straps, said apparatus comprising:

(a) a robotic arm having a full degree of rotational freedom;

(b) a pair of grid support members disposed on a handling means at a free end of said robotic arm to enable each said grid support member to approach or move away from each member;

(c) a key rotation device disposed on said grid support members for rotating said plurality of keys about each key axis, wherein said key rotation device is provided with a plurality of engagement sections which are positioned to correspond with the ends of said keys inserted into said insertion openings of said grid and engage with the ends of said keys; and (d) a key moving device disposed on said grid support members for holding the ends of said keys and for moving said keys in the direction of their axes, wherein said key moving device comprises a pair of rotatable roller members disposed longitudinally parallel to each other on said grid support members to enable clamping of said keys between said roller members by rotating the support arms into position.

2. An apparatus as claimed in claim 1, wherein said robotic arm means is disposed on a transporting.

3. An apparatus as claimed in claim 2, wherein said transporting means is a gate-shaped travelling bridge, and said robotic arm means is disposed facing downwards on said gate-shaped travelling bridge.

4. An apparatus as claimed in claim 1, wherein said pair of grid support members are disposed parallel to each other and movable towards and away from each other.

5. An apparatus as claimed in claim 1, wherein said robotic arm further comprises: two sets of elbow members which are linked at an elbow section, and said two elbow members to each set are coaxially connected in a relatively rotatable manner.

6. An apparatus for removing a plurality of keys (6, 9) from a grid of a fuel assembly after inserting fuel rods in said grid which is formed by a plurality of straps of a thin longitudinal strip form intersecting at right angles to each other to form a plurality of grid cells and having dimples formed on one adjacent pair of walls of said grid cells and springs formed on opposing pair of walls of said grid cells, said plurality of keys are inserted in said grid in a longitudinal direction of said straps through insertion openings formed near the intersections of said plurality of straps, said apparatus comprising:

(a) a robotic arm having a full degree of rotational freedom;

(b) a pair of grid support members disposed on a handling means at a free end of said robotic arm to enable each said grid support member to approach or move away from each member;

(c) a key rotation device disposed on said grid support members for rotating said plurality of keys about each key axis; and (d) a key moving device disposed on said grid support members for holding the ends of said keys and for moving said keys in the direction of their axes, wherein said key moving device comprises a pair of rotatable roller members disposed longitudinally parallel to each other on said grid support members to enable clamping of said keys between said roller members by rotating the support arms into position.

* * * * *